Patented Aug. 28, 1934

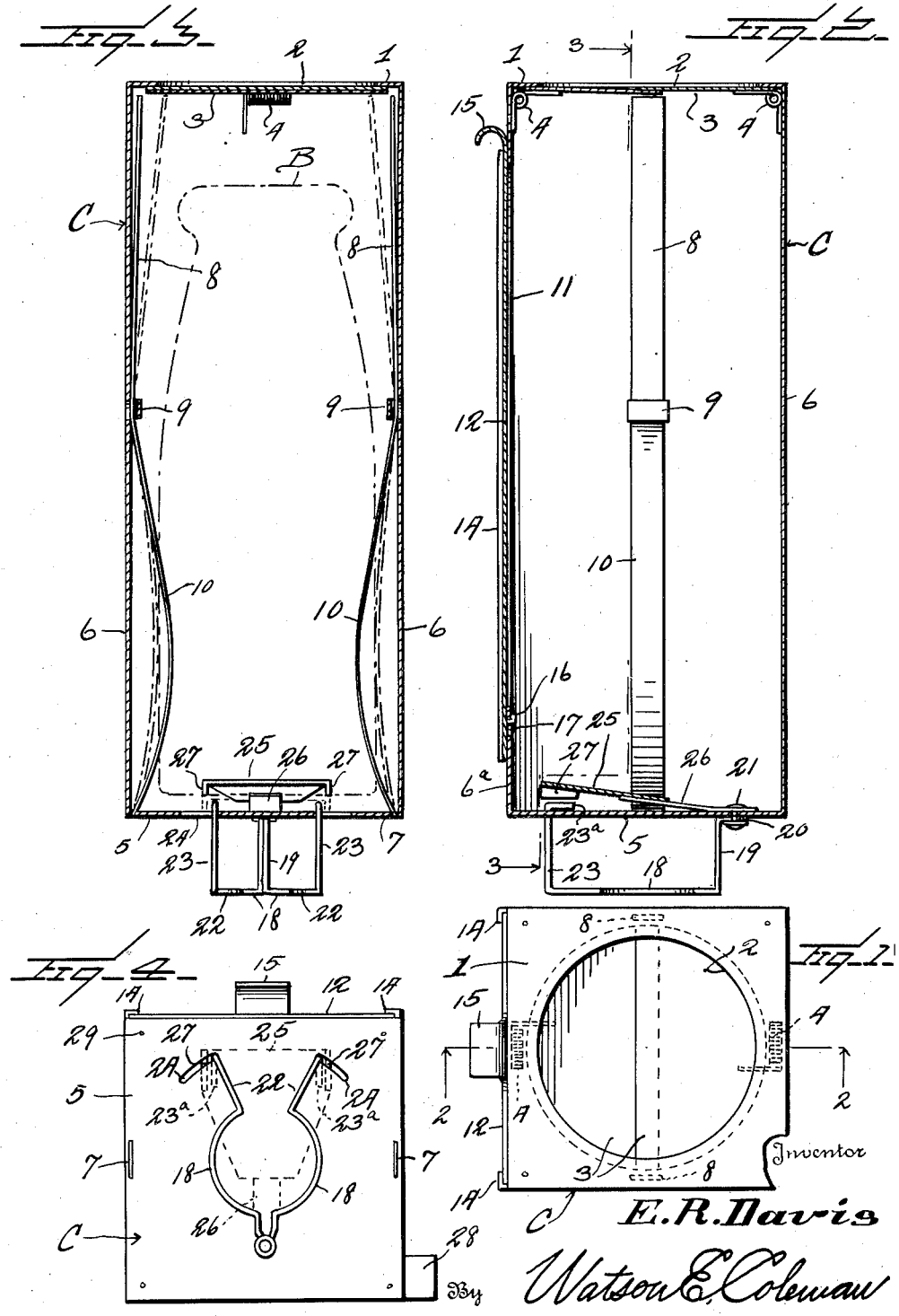

1,971,707

UNITED STATES PATENT OFFICE 1,971,707

CONTAINER FOR MILK BOTTLES

Edward R. Davis, Wilkes-Barre, Pa.

Application February 6, 1934, Serial No. 710,029

5 Claims. (Cl. 232—41)

This invention relates to a container for milk bottles, and it is an object of the invention to provide a device of this kind especially adapted for household use and which provides means to effectively prevent theft of the milk after being delivered.

It is also an object of the invention to provide a device of this kind having means for holding an extra bottle and wherein said extra bottle is held against release by a bottle within the container.

The invention consists in the details of construction and in the combination and arrangement of the several parts of my improved container for milk bottles whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in top plan of a container constructed in accordance with an embodiment of my invention;

Figure 2 is a sectional view taken substantially on the line 2—2 of Figure 1 with parts in elevation;

Figure 3 is a sectional view taken substantially on the line 3—3 of Figure 2 with parts in elevation;

Figure 4 is a view in bottom plan of the container as herein embodied.

As disclosed in the accompanying drawing, C denotes a container of desired dimensions and which preferably has its walls made of sheet metal although, of course, I do not wish to be understood as limiting myself in this respect. The top wall 1 of the container is provided with a circular opening 2 of a diameter to readily permit the passage therethrough of a bottle or milk. This opening 2 is normally closed by the lid sections 3 each substantially semi-circular in form with their straight marginal portions lapping. These lid sections 3 at diametrically opposed points are connected to the top wall 1 by the spring hinges 4. These hinges 4 normally maintain the sections 3 in closed position but readily allow the same to be swung inwardly or downwardly of the container C to place a bottle of milk within the container.

The bottom wall 5 of the container adjacent to opposed side walls 6 thereof are provided with the opposed slots 7, said slots being aligned and occupying a plane at right angles to the plane occupied by the spring hinges 4. The openings 7 provide means for effective mounting of the lower end portions of the elongated flat springs 8. These springs 8 are freely disposed through the holding or guiding loops 9 struck inwardly from the opposed walls 6 of the container and said springs 8 are of a length to terminate closely adjacent to the top wall 1 but at points spaced therefrom sufficient to allow the upper or free ends of said springs 8 to be moved under the lapping portions of the lid sections 3 to hold the same against opening movement after a bottle of milk has been placed within the container.

As is clearly illustrated in the accompanying drawing outward swinging movement of the lid sections 3 is prevented in view of the fact that the marginal portions of said lid sections underlie the marginal portion of the top wall 1 defining the opening 2.

The portions of the springs below the holding or guiding loops 9 are normally disposed on inbows 10 to an extent or for a distance sufficient to intersect the path of travel as a bottle B is placed within the container. As the bottle is placed within the container the bottom portion thereof will contact with the inbow portions 10 of the springs 8 resulting in a depression of said portions 10 effecting an inward deflection or movement of the upper or free ends of the springs 8 to bring said upper or free ends under the lapping portions of the lid sections 3 to effect the desired locking of said sections.

One side wall of the container C has a major portion cut out, as at 11, to provide an opening of a size sufficient to allow removal therethrough of the bottle B within the container C. If desired the container C may be mounted upon a door frame in such position that when the door is closed, removal of the bottle B through the opening 11 is prevented.

However, as herein disclosed the opening 11 is closed by a sliding plate 12 removable between the vertical guideways 14 and which plate when in its lowered position, as illustrated in Figure 2, effectively closes the opening 11. The upper end of this plate 12 carries a finger piece 15 whereby the plate may be conveniently raised or lowered. The lower end portion of the plate 12 carries an inwardly disposed and upwardly facing hook member 16 which enters the container C through a vertically disposed slot 17 provided in the adjacent side wall 6. This slot 17 is of a length in excess of the upstanding bill of the hook member 16 so that after moving the plate 12 downwardly with the shank or stem of the hook member 16 at the lower end of the slot 17, inward pressure upon the portion 6ª of the wall of the container immediately below the plate 12 will force said portion 6ª inwardly sufficient to allow the plate 12 to be raised without hindrance or obstruction being offered by the hook member 16. The same operation is preferably followed in closing the plate 12 only that after the lower portion 6ª has sprung back over the hook member 16 the plate 12 is raised to cause the bill of the hook member 16 to overlie the inner face of the portion 6ª immediately above the upper end of the slot 17 so that the portion 6ª is locked against inward pressure.

Underlying the bottom wall 5 of the container C are the opposed spring jaws 18 adjacent ends of which being continued by the upstanding arms 19 integrally connected and provided at their junctures with a laterally disposed eye member 20 whereby said arms 19 may be effectively anchored to the bottom wall 5 by a rivet 21 or other desired holding member.

The opposite or outer end portions of the jaws 18 are continued by the diverging arms 22 continued by the upstanding elongated members 23 which enter the container C through the suitably positioned slots 24 provided in the bottom wall 5 of the container. Each of these members 23 has its end portion within the container continued by a laterally extending portion 23ª.

Positioned above the portions 23ª of the members 23 is an elongated plate 25 carried by the outer end portion of a spring leaf 26 having an end portion anchored to the bottom wall 5 and preferably by the rivet 21 or kindred member. At opposite sides the plate 25 is provided with depending flanges 27 which, when the plate 25 is depressed, lap the outer sides of the extensions 23ª and thus hold the jaws 18 against opening or separating movement. The spring 26 normally maintains the plate 25 and its flanges 27 above the extensions 23ª and the members 23 so that when desired and with the container C empty the neck portion of an extra milk bottle may be conveniently engaged between the jaws 18. However, when a milk bottle or kindred container is placed within the container C the weight of such bottle upon the plate 25 will depress the same and thus swing the flanges 27 of the plate 25 into locking relation with respect to the extensions 23ª of the members 23. By this means an extra bottle of milk may be delivered to a household and said extra bottle cannot be removed until after the bottle within the container C has been taken out or raised sufficiently within the container to allow the plate 25 to raise into inoperative position.

When the container is secured to a door frame carrying the conventional bumper strip it is of advantage to interpose between the container and the door frame a strip 28, as illustrated in Figure 4, which can be applied to either side of the container as may be required and which strip 28 is of the same thickness as the bumper strip on the door frame so that the container C will be maintained in applied position in what might be termed a level position. The fastening means for holding the container in place may constitute nails and certain of which nails may be directed through the strip 28. It is believed to be understood that when the strip 28 is used a portion of the container C overlies the bumper strip of the door frame.

To facilitate the insertion of the nails the top and bottom walls 1 and 5 at their corners are provided with initially reduced portions 29. The nails as applied are inclined with respect to the member of the frame with which the container is engaged so that each of the nails may also be directed through the side wall of the container C directly opposed to the frame.

From the foregoing description it is thought to be obvious that a container for milk bottles constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising, in combination, a container for a bottle, said container having an entrance opening in one of its walls, a closure means for said opening, means under control of the bottle when in the container for maintaining said closure means effective, a pair of relatively movable jaws carried by a wall of the container to engage and hold a second bottle, and means under control of a bottle within the container for holding the jaws against separating movement.

2. A device of the class described comprising a container having an entrance opening in one of its walls, a pair of hinged closure members for said opening, means for normally maintaining said closure members in closed position, a pair of spaced elongated springs within the container, each of said springs having a bowed portion extending inwardly of the container, said bowed portions being engaged by the bottle when placed within the container to move the springs into positions to lock the closure members against opening movement.

3. A device of the class described comprising, in combination, a container to receive a milk bottle, jaws carried by the container and arranged exteriorly thereof, said jaws being movable one toward the other and adapted to be engaged around the neck portion of a bottle, said jaws having parts extending within the container, and means within the container for engaging the parts of the jaws extending within the container for holding said jaws against separating movement.

4. A device of the class described comprising, in combination, a container to receive a milk bottle, jaws carried by the container and arranged exteriorly thereof, said jaws being movable one toward the other and adapted to be engaged around the neck portion of the bottle, said jaws having parts extending within the container, and means within the container for engaging the parts of the jaws extending within the container for holding said jaws against separating movement, said holding means within the container being normally free of said parts of the jaws, said holding means moving into locking engagement with said parts under the weight of the bottle placed within the container.

5. A device of the class described comprising a container having an entrance opening in one of its walls, and a removal opening in a second of its walls, a closure member for the entrance opening, means within the container and operated by the bottle when placed in the container for locking the closure member against opening movement, a sliding plate for closing the removal opening of the container, the wall of the container having the removal opening being provided with a slot adjacent to said opening with the major axis of the slot disposed toward the opening, the portion of said wall of the container having the slot being depressible, and a hook member carried by the plate for insertion through the slot, said hook member having a bill disposed toward the opening, said hook member when at one end of the slot readily passing through the slot, said hook member when at the opposite end of the slot having locking engagement with the associated wall of the container.

EDWARD R. DAVIS.